(12) United States Patent
Hahm

(10) Patent No.: US 11,337,582 B2
(45) Date of Patent: May 24, 2022

(54) DISHWASHER AND DRIVING METHOD THEREFOR

(71) Applicant: SAMSUNG ELECTRONICS CO., LTD., Suwon-si (KR)

(72) Inventor: Jungyoon Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/962,553

(22) PCT Filed: Jan. 11, 2019

(86) PCT No.: PCT/KR2019/000503
§ 371 (c)(1),
(2) Date: Jul. 16, 2020

(87) PCT Pub. No.: WO2019/143078
PCT Pub. Date: Jul. 25, 2019

(65) Prior Publication Data
US 2020/0405122 A1    Dec. 31, 2020

(30) Foreign Application Priority Data
Jan. 16, 2018    (KR) .................. 10-2018-0005590

(51) Int. Cl.
*A47L 15/00*    (2006.01)
*A47L 15/42*    (2006.01)
(52) U.S. Cl.
CPC ....... *A47L 15/4291* (2013.01); *A47L 15/0047* (2013.01); *A47L 15/4214* (2013.01);
(Continued)

(58) Field of Classification Search
None
See application file for complete search history.

(56) References Cited

U.S. PATENT DOCUMENTS

| 5,660,193 A | 8/1997 | Archer et al. |
| 2011/0290284 A1 | 12/2011 | Chung et al. |
| 2014/0224286 A1 | 8/2014 | Lee et al. |

FOREIGN PATENT DOCUMENTS

| EP | 2 820 997 | 4/2016 |
| JP | 10-24003 | 1/1998 |

(Continued)

OTHER PUBLICATIONS

International Search Report dated Apr. 25, 2019 from International Application No. PCT/KR2019/000503, 4 pages.

(Continued)

*Primary Examiner* — Levon J Shahinian
(74) *Attorney, Agent, or Firm* — Staas & Halsey LLP

(57) ABSTRACT

A dishwasher includes a dishwashing tub in which dishes are washed; a first tank configured to store therein cold washing water to be used for a next stroke; and a second tank configured to store therein hot washing water, which has been used in the dishwashing tub. The second tank is placed adjacently to the first tank to transfer heat from the stored hot washing water to the cold washing water. An opening is configured to deliver the hot washing water to the dishwashing tub; and a circulation pipe is configured to connect the dishwashing tub and the second tank to enable the hot washing water to circulate between the second tank and the dishwashing tub. A circulation valve is configured to allow the hot washing water to pass therethrough or to block the hot washing water from passing therethrough.

15 Claims, 18 Drawing Sheets

(52) U.S. Cl.
CPC ....... *A47L 15/4219* (2013.01); *A47L 15/4221* (2013.01); *A47L 15/4225* (2013.01); *A47L 15/4229* (2013.01); *A47L 15/4278* (2013.01); *A47L 2501/03* (2013.01); *A47L 2501/18* (2013.01)

(56) References Cited

FOREIGN PATENT DOCUMENTS

| KR | 10-0550853 | 2/2006 |
|---|---|---|
| KR | 10-0819518 | 4/2008 |
| KR | 10-1293019 | 8/2013 |
| KR | 10-2014-0101630 | 8/2014 |
| KR | 10-2014-0101633 | 8/2014 |
| KR | 10-2016-0093971 | 8/2016 |
| KR | 10-1735104 | 5/2017 |

OTHER PUBLICATIONS

Extended European Search Report dated Mar. 1, 2021 from European Application No. 19740900.6, 9 pages.
Korean Office Action dated Dec. 24, 2021 from Korean Application No. 10-2018-0005590.

FIG. 18

| | EXTERNAL WATER SUPPLY | CIRCULATION | DRAINAGE | EXTERNAL WATER SUPPLY & FIRST TANK WATER SUPPLY* | |
|---|---|---|---|---|---|
| 600s | 60s | 420s | 60s | 60s | |
| | TO FIRST TANK | 420s / 420s | 60s | TO FIRST TANK | TO SUMP |
| | 2.5L | 3000rpm | | 0.7L(CR) / 0.8L(HR) | |
| WATER SUPPLY VALVE | | off | | on | |
| CIRCULATION VALVE | | on | | off | |

*SIMULTANEOUS OPERATION

DISHWASHER AND DRIVING METHOD THEREFOR

CROSS-REFERENCE TO RELATED APPLICATIONS

This application is a U.S. National Stage Application which claims the benefit under 35 U.S.C. § 371 of International Patent Application No. PCT/KR2019/000503 filed on Jan. 11, 2019, which claims foreign priority benefit under 35 U.S.C. § 119 of Korean Patent Application No. 10-2018-0005590 filed on Jan. 16, 2018 in the Korean Intellectual Property Office, the contents of each of which are incorporated herein by reference.

TECHNICAL FIELD

The disclosure relates to a dishwasher, and more particularly, to a dishwasher for saving energy by allowing washing water for a next stroke to recover heat from washing water that has been used for washing dishes, and a driving method thereof.

BACKGROUND ART

A dishwasher sprays washing water at a high pressure through a nozzle to wash dishes. As washing water used for washing dishes is hot water which was heated during a washing process, there is a difference in temperature between the hot water and cold water newly supplied for a next stroke. From an energy-saving perspective, recovery of heat by the cold water, which is for a next stroke, from the hot water used for washing is very desirable. EU Patent No. 2820997 discloses a dishwasher in which a pipe for supplying cold water, which is newly introduced for a next stroke, passes through a container storing therein hot water used for washing dishes in zigzags to absorb heat from the hot water.

Such dishwasher including a heat recovery module using the foregoing pipe-type heat exchanger has very low heat exchange efficiency as a heat exchange area between hot water and cold water is small. Also, the conventional dishwasher has a large container for storing washing water used for washing, and a complicated pipe structure and therefore it is difficult to implement such dishwasher in practice.

Technical Problem

An aspect of the disclosure is to solve the conventional problems described above, and provide a dishwasher having excellent heat recovery efficiency while utilizing an existing structure to the maximum and minimizing a change in the structure, and a driving method thereof.

Technical Solution

According to an embodiment of the disclosure, there is provided a dishwasher. The dishwasher according to the disclosure includes a dishwashing tub in which dishes are washed; a first tank configured to store therein cold washing water to be used for a next stroke; a second tank configured to store therein hot washing water, which has been used in the dishwashing tub, and being placed adjacently to the first tank to transfer heat from the stored hot washing water to cold washi may provide an effect of having ng water in the first tank, and comprising an opening configured to deliver the hot washing water to the dishwashing tub; and a circulation pipe configured to connect the dishwashing tub and the second tank to enable the hot washing water to circulate between the second tank and the dishwashing tub and comprising a circulation valve configured to allow the hot washing water to pass therethrough or to block the hot washing water from passing therethrough. The dishwasher according to the disclosure has excellent heat recovery efficiency and may perform a heat recovery function without drastic change to its structure as the hot washing water circulates between the second tank and the dishwashing tub and transfers heat to cold washing water.

The dishwashing tub may include a sump which is arranged in a lower part of the dishwashing tub to gather hot washing water after use.

The dishwasher may further include a washing water supply pipe configured to connect the first tank and the sump. Accordingly, cold washing water for a next stroke may be supplied to the sump after recovering heat.

The dishwasher may further include a water supply pipe configured to supply cold washing water from the outside and to be connected to the washing water supply pipe, and the water supply pipe may be configured to supply cold washing water to the first tank through the washing water supply pipe. Accordingly, the washing water supply pipe may be used for both supplying and discharging washing water.

The dishwasher may further include a water softener configured to change hard water into soft water, and the water supply pipe may be configured to discharge cold washing water which has been softened by the water softener to the washing water supply pipe.

The washing water supply pipe may include a water supply valve which is arranged after a connection point of the water supply pipe and supplies cold washing water or blocks supply of cold washing water. Accordingly, cold washing water may be prevented from being supplied to the sump when hot washing water is supplied to the second tank.

The second tank may be accommodated in the first tank, and the first tank and the second tank may be mounted in a left side or right side of the dishwasher. Accordingly, not only space can be utilized to the maximum and potential energy of washing water in the first and second tanks is increased to efficiently drain hot washing water and supply cold washing water, but also heat recovery efficiency may be improved.

The second tank may be formed in the first tank by a blow molding.

The first tank may include a pair of panel-shaped external walls facing each other leaving a space therebetween, and an external side surface connecting outer circumferences of the pair of panel-shaped external walls.

The second tank may include a pair of panel-shaped internal walls respectively facing the pair of panel-shaped external walls leaving a space therebetween, and an internal side surface connecting outer circumferences of the pair of panel-shaped internal walls.

The second tank may include an insert molding pipe which is integrally formed to extend from the first tank to the dishwashing tub.

The insert molding pipe comprises a cap which is coupled to an end part extending to the dishwashing tub. Accordingly, the first and second tanks may be conveniently mounted in a later side of the dishwasher.

The circulation valve may include a connection pipe connected to the second tank through the first tank.

The dishwasher may further include a pump configured to forcibly circulate the hot washing water between the dishwashing tub and the second tank.

The dishwasher may further include a distributor configured to distribute cold washing water, which is supplied by the pump, to a plurality of nozzles in the dishwasher, and the distributor may include a distribution blocking part configured to block a distribution of hot washing water during circulation of hot washing water. Accordingly, washing water for heat recovery may be prevented from being distributed through the distributor.

The second tank may include an overflow partition to allow hot washing water supplied by the circulation valve to overflow to the opening.

The second tank may include a plurality of downwardly-inclined inclination guides to prevent impurities from being accumulated.

The first tank is integrally formed in the case brake and thus is easy to be designed.

The dishwasher may further include a controller to control and close the water supply valve to store cold washing water for a next stroke in the first tank, to control and open the circulation valve to supply hot washing water from the dishwasher to the second tank, to control and close the circulation valve, and to control and open the water supply valve to use cold washing water.

According to another embodiment of the disclosure, there is provided a dishwasher comprising a dishwashing tub in which dishes are washed; a first tank configured to store therein cold washing water to be used for a next stroke; a sump configured to store therein hot washing water that has been used for washing dishes in the dishwasher; a second tank configured to store therein hot washing water introduced from the sump and to be accommodated in the first tank to transfer heat of the stored hot washing water to cold washing water in the first tank; a circulation pipe configured to connect the sump and the second tank and comprising a circulation valve configured to allow hot washing water, which has been used to wash dishes, to pass therethrough or to block the hot washing water from passing therethrough; and a washing water supply pipe configured to connect the sump or the dishwashing tub and the first tank and comprising a water supply valve configured to allow cold washing water, which will be used for a next stroke, to pass therethrough or to block the cold washing water from passing therethrough.

According to still another embodiment of the disclosure, there is provided a driving method of a dishwasher. The driving method comprises storing cold washing water which will be used for a next stroke in a first tank; washing dishes in a dishwashing tub; supplying hot washing water used in the dishwashing tub to a second tank, transferring heat to cold washing water in a first tank which is adjacent to the second tank, and circulating on at least one occasion hot washing water from the second tank to the dishwashing tub; draining hot washing water which has been circulated between the second tank and the dishwashing tub; and supplying cold washing water from the first tank to the dishwashing tub.

Advantageous Effects

As described above, a dishwasher according to the disclosure has the following effects:

First, as an internal tank and an external tank contact each other in a large area, heat recovery efficiency may be improved.

Second, as a case brake function is integrally formed in an external tank, simple design is guaranteed.

Third, a tank-in-tank structure whereby an external tank accommodates an internal tank therein is shaped like a plate with a narrow width and thus even if such structure is installed in a left or right side of a door of the dishwasher, the overall volume of the dishwasher is not greatly increased.

Fourth, as the tank-in-tank structure is mounted in a left or right side of the dishwasher that is above a sump provided at the bottom of the dishwasher, potential energy of washing water is high. As a result, operation time is shortened, and drainage or supply of washing water is easily performed even in an area with a low hydraulic pressure.

Fifth, a dishwasher having excellent heat recovery efficiency and a short flow path for washing water is provided by minimizing a change in existing components of the dishwasher and adding only a minimum number of components, e.g. an external tank and an internal tank, a circulation pipe and washing water supply pipe, a circulation valve and a water supply valve.

Sixth, as washing water used for washing and washing water for a next stroke are not mixed with each other, deterioration of washing performance may be prevented. That is, a first tank forms only one inlet and outlet path of washing water for a next stroke, and a second tank forms a circulation path through which washing water used for washing is introduced from a sump and then flows to a dishwashing tub and gathers in the sump again. As the dishwashing tub maintains a warm atmosphere immediately after a washing process is completed, washing water, heat of which was lost in the second tank can absorb heat again, and the washing water circulates and continuously transfers heat to washing water in the first tank for a next stroke.

DESCRIPTION OF DRAWINGS

FIG. 18 shows a table setting forth states of a water supply valve and a circulation valve during a washing stroke.

BEST MODE

Below, embodiments of the disclosure will be described in detail with reference to accompanying drawings, to be easily carried out by a person having an ordinary skill in the art. The disclosure may be embodied in various different forms, and not limited to the embodiment set forth herein. For clarity of description, like numerals refer to like elements throughout.

Below, washing water the temperature of which has risen due to heating at the time of washing is called 'hot washing water' and new washing water which is newly introduced for a next stroke is called 'cold washing water'.

Figure 1:
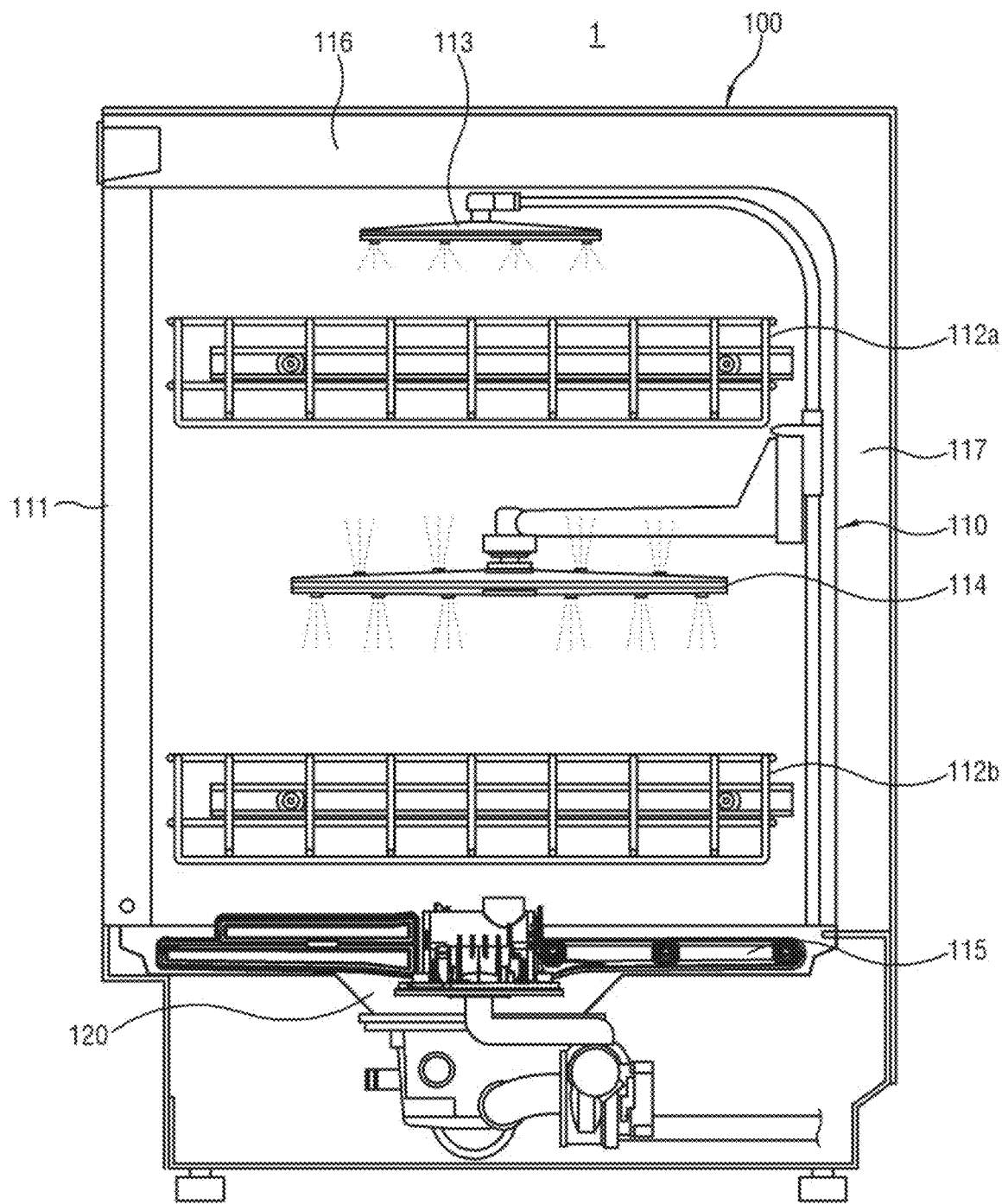
FIG. 1 is a perspective view briefly showing a structure of a dishwasher according to an embodiment of the disclosure.

Below, an entire structure of a dishwasher 1 will be described with reference to FIG. 1.

A dishwasher 1 includes a main body 100 forming an external appearance of the dishwasher, a dishwashing tub 110 provided in the main body 100, baskets 112a and 112b provided in the dishwashing tub 110 to store dishes, and spray nozzles 113, 114 and 115 spraying washing water.

The dishwashing tub 110 is roughly shaped like a box with its front part being open to put in dishes and remove the same from the dishwashing tub 110. The front opening of the dishwashing tub 110 may be open and closed by a door 111. The dishwashing tub 110 includes an upper wall 116, a rear wall 117, a left wall (118 in FIG. 2) and a right wall (119 in FIG. 2).

The baskets 112a and 112b may be a wire rack including wires so that washing water is not stagnant and may pass through the baskets 112a and 112b. The baskets 112a and 112b are detachably attached to an inside of the dishwashing tub 110. The baskets 112a and 112b include an upper basket 112a provided in an upper part of the dishwashing tub 110, and a lower basket 112b provided in a lower part of the dishwashing tub 110.

The spray nozzles 113, 114 and 115 spray washing water at a high pressure to wash dishes. The spray nozzles 113, 114 and 115 include a upper rotation nozzle 113 provided in an upper part of the dishwashing tub 110, a middle rotation nozzle 114 provided in the middle of the dishwashing tub 110, and a lower nozzle 115 provided in a lower part of the dishwashing tub 110.

The upper rotation nozzle 113 is provided in an upper part of the upper basket 112a, and sprays washing water downwards when rotating by hydraulic pressure. For such purpose, spray holes may be provided in a lower part of the upper rotation nozzle 113. The upper rotation nozzle 113 sprays washing water directly toward dishes placed in the upper basket 112a.

The middle rotation nozzle 114 may be provided between the upper and lower baskets 112a and 112b and may spray washing water upwards and downwards when rotating by hydraulic pressure. For such purpose, spray holes may be provided in upper and lower parts of the middle rotation nozzle 114. The middle rotation nozzle 114 sprays washing water directly toward dishes placed in the upper and lower baskets 112a and 112b.

The lower nozzle 115 does not move unlike the middle rotation nozzle 113 and the upper rotation nozzle 114, and is fixed to one side of the dishwashing tub 110. The lower nozzle 115 is placed adjacently to the rear wall 117 or a bottom of the dishwashing tub 110, and sprays washing water to a front part or upper part of the dishwashing tub 110. If the lower nozzle 115 sprays dishwashing water to a front part of the dishwashing tub 110, the washing water from the lower nozzle 115 may be reflected to dishes by a vane (not shown) rather than being sprayed directly to dishes. The lower nozzle 115 may include a plurality of spray holes arranged in left and right directions of the dishwashing tub 110.

Figure 2:
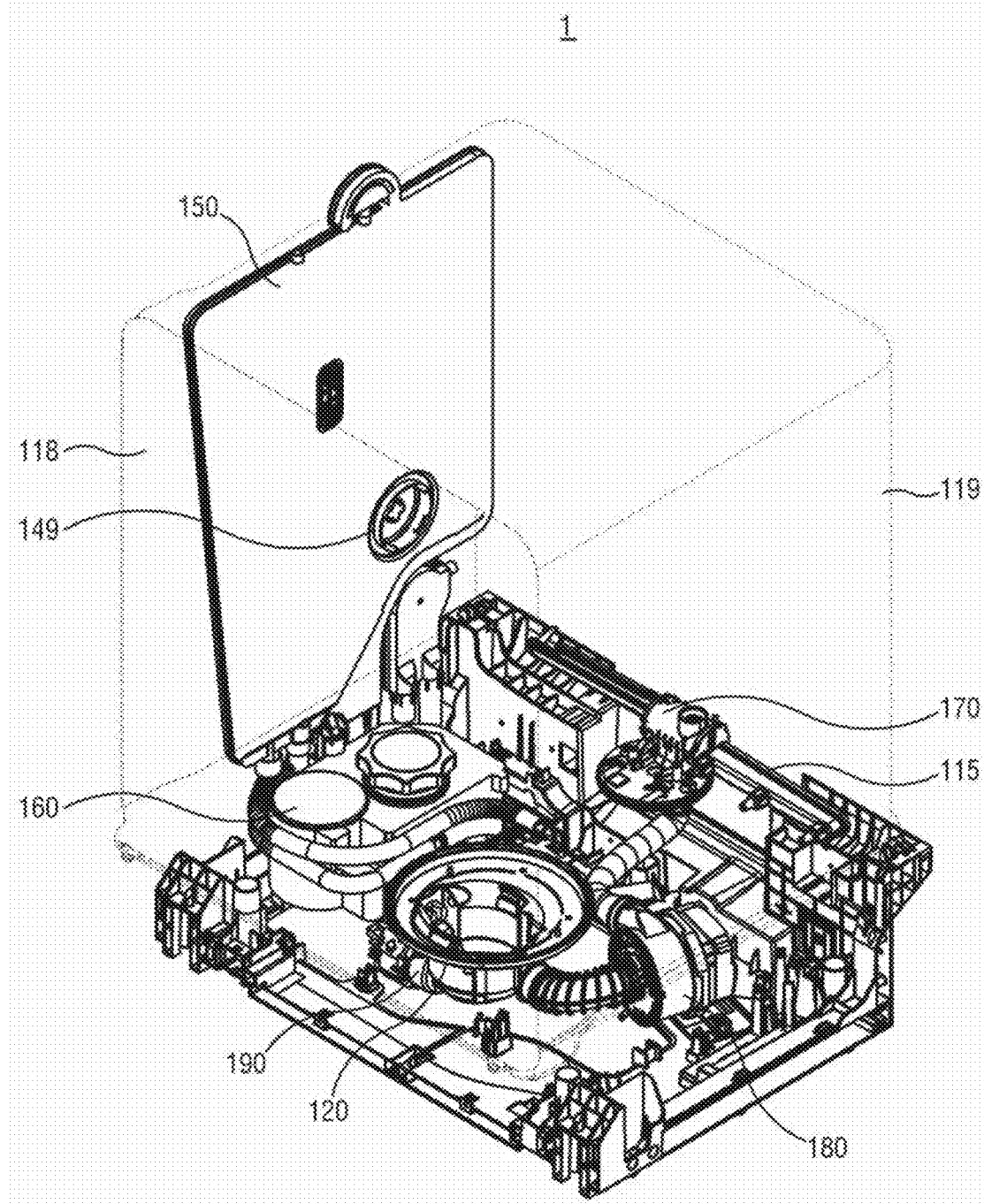
FIG. 2 illustrates a flow path for washing water of a dishwasher according to an embodiment of the disclosure.

FIG. 2 illustrates a flow path for washing water and a pipe structure of the dishwasher 1 according to the embodiment of the disclosure.

Figure 14:
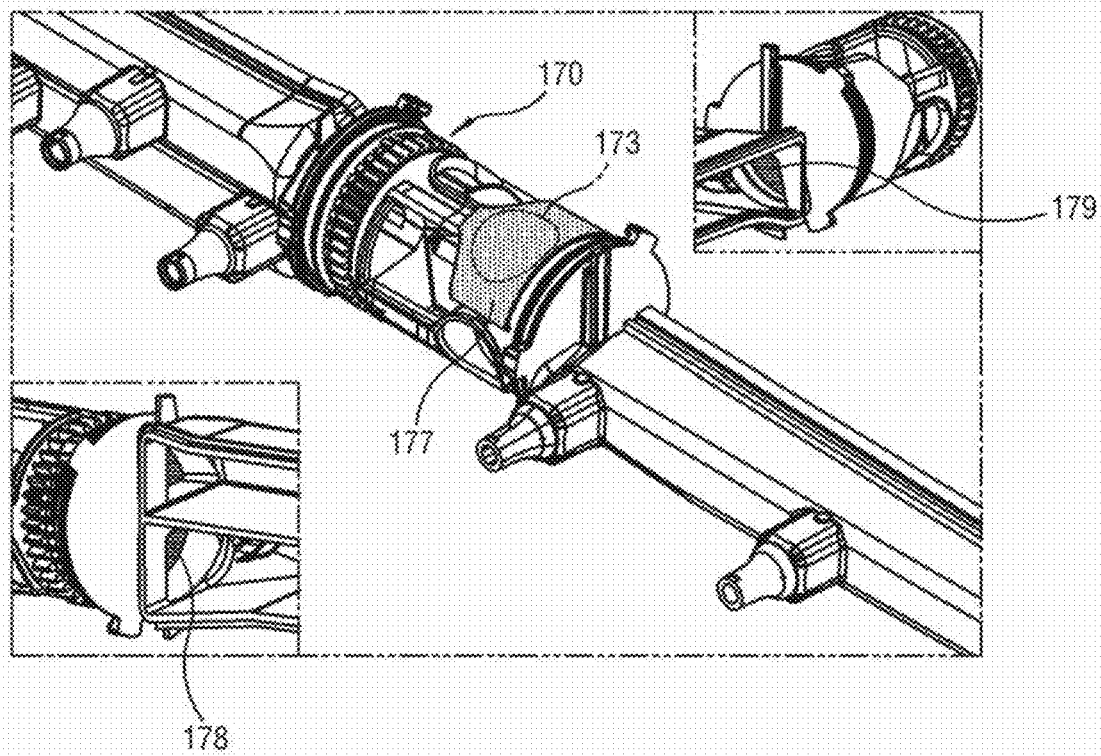
FIG. 14 illustrates a state of a distributor blocking washing water from being supplied to all nozzles.

Dishwasher 1 includes a sump 120 provided in a lower part of the dishwashing tub 110, a heat recovery module 150 allowing cold washing water to be used for a next stroke to recover heat from the hot washing water that has been already used, a water softener 160 softening cold washing water, which is hard water, into soft water, a distributor 170 distributing cold washing water in the sump 120 to the nozzles 113, 114 and 115, a circulation pump 180 pumping cold washing water in the sump 120 and supplying the cold washing water to the distributor 170, a drainage pump 190 draining hot washing water and dirt from the sump 120 to an outside of the main body 100, and a controller (200 in FIG. 14).

Figure 3:
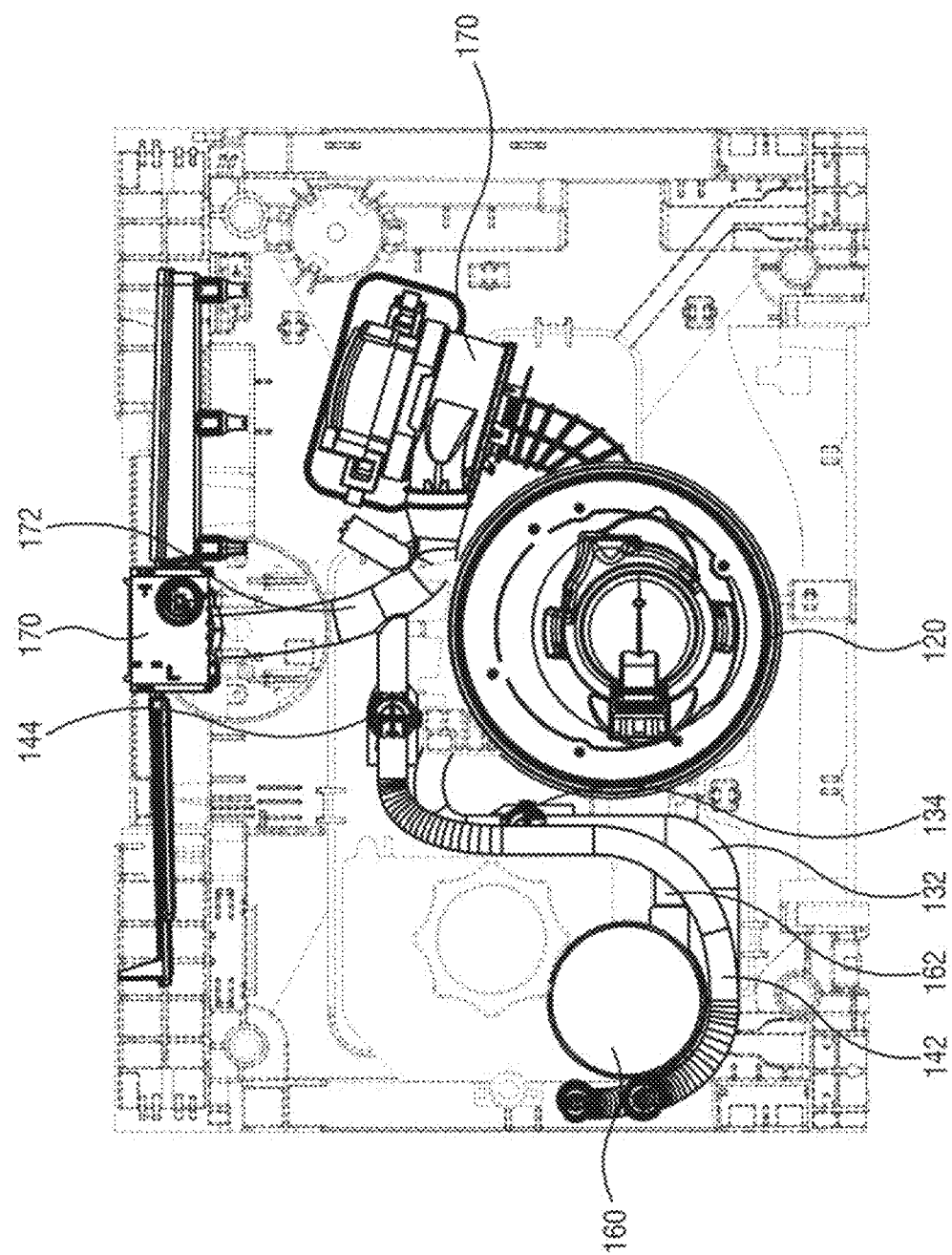
FIG. 3 illustrates a pipe structure for washing water of the dishwasher.

FIG. 3 illustrates a pipe structure for washing water of the dishwasher 1. The dishwasher 1 includes a washing water supply pipe 132 connecting the sump 120 and a first tank 130, a circulation pipe 142 connecting an outlet of the circulation pump 180 and a second tank 140, a water supply pipe 162 connecting a water softener 160 and the washing water supply pipe 132, and a distribution pipe 172 connecting the distributor 170 and the circulation pipe 142. The washing water supply pipe 132 includes a water supply valve 134 which is placed after a connection point of the water supply pipe 162 from the first tank 130 and allows washing water to be used for a next stroke to pass therethrough or blocks the washing water. The circulation pipe 142 includes a circulation valve 144 which is placed after a connection point of the distribution pipe 172 from the circulation pump 180 and allows washing water to be used for washing to pass therethrough or blocks washing water to be used for a next stroke.

Figure 4:
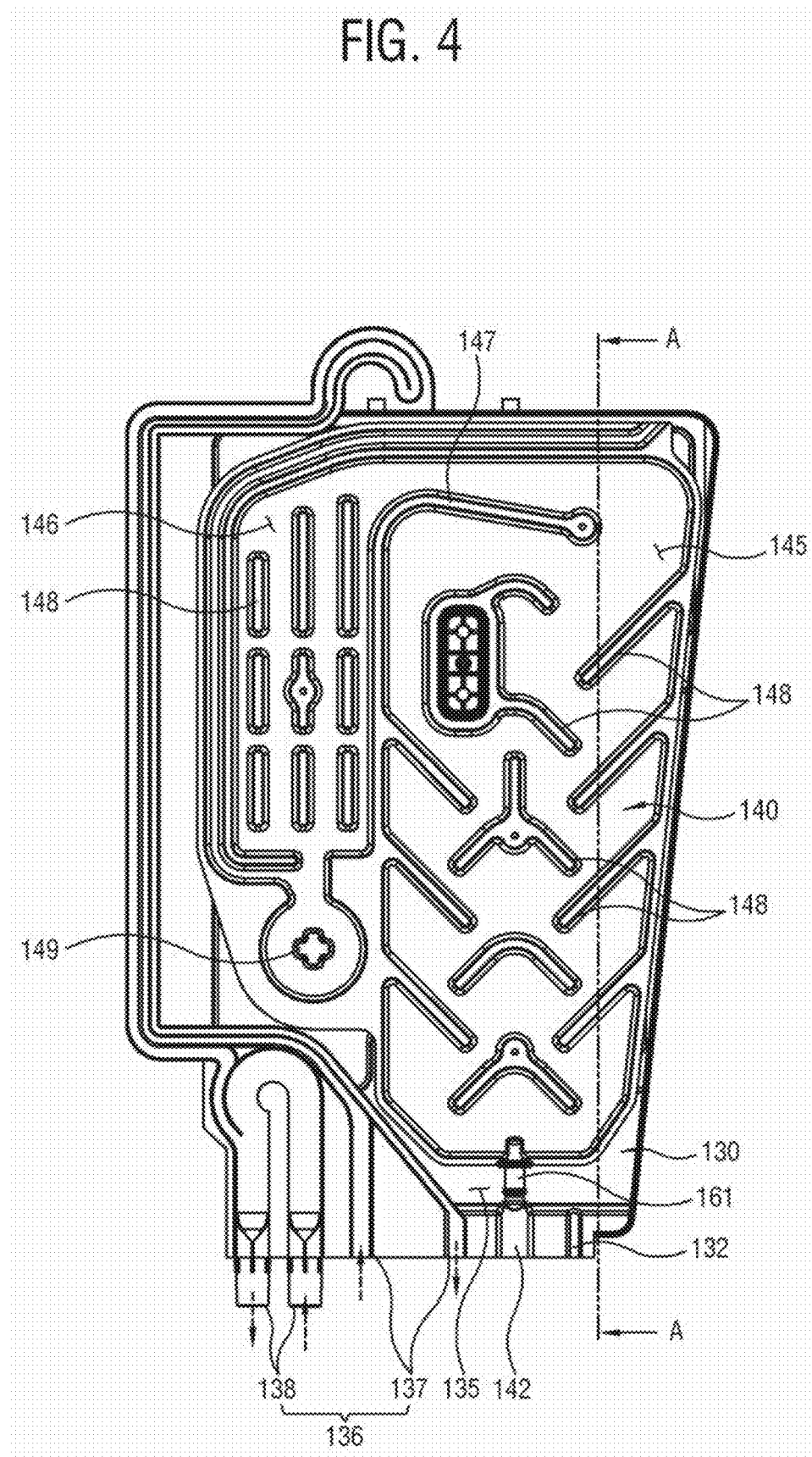
FIG. 4 illustrates an internal structure of a heat recovery module in which washing water to be used for a next stroke recovers heat from washing water that has been used for washing dishes.
Figure 5:
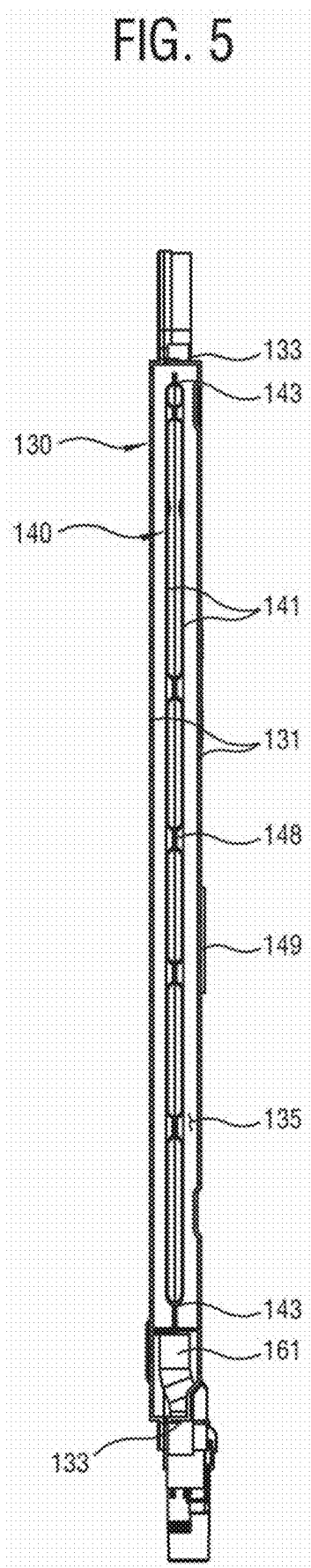
FIG. 5 is a cross-sectional view of the heat recovery module in FIG. 4.

FIG. 4 illustrates an internal structure of a heat recovery module 150 in which cold washing water recovers heat from hot washing water. FIG. 5 is a cross-sectional view of the heat recovery module 150 in FIG. 4.

The heat recovery module 150 includes the first tank 130 storing cold washing water therein and the second tank 140 accommodated in the first tank 130 or placed adjacently to the first tank 130 and storing hot washing water therein. The heat recovery module 150 is mounted in a left side or right side of the dishwashing tub 110 based on the door 111. The heat recovery module 150 may otherwise be installed in a rear or upper side of the heat recovery module 150 as necessary.

The first tank 130 accommodates the first tank 140 therein desirably in a tank-in-tank structure. On the contrary, the first tank 130 may be accommodated in the second tank 140 depending on design. The first tank 130 includes a pair of panel-shaped external walls 131 spaced from each other and an external side surface 133 connecting outer circumferences of the pair of panel-shaped external walls 131.

The first tank 130 includes a tank accommodation 135 accommodating the second tank 140 therein, and a case brake 136 provided in an outside of the tank accommodation 135. The tank accommodation 135 is connected to the washing water supply pipe 132. As shown in FIG. 5, the tank accommodation 135 stores in a space remaining after the second tank 140 is accommodated in the tank accommodation 135, cold washing water introduced from the water softener 160 through the washing water supply pipe 132. The cold washing water stored as above absorbs heat from hot washing water in the second tank 140. The tank accommodation 135 supplies the washing water which has absorbed heat from the second tank 140 to the sump 120 or the dishwashing tub 110 through the washing water supply pipe 132.

The case brake 136 includes an external water supply pipe 137 which causes cold washing water supplied by an external water supply hose to flow into a lower part of the first tank 130 and then to go up and then go down the first tank 130 to be supplied to the water softener 160, and a drainage pipe 138 which causes hot washing water discharged from the sump 120 through the drainage pump 190 to flow into a lower part of the first tank 130 and to go up and then down the first tank 130 to be discharged to the outside. The case brake 136 may further have a back flow prevention function and an air bubble discharge function. As the case brake 136 of the first tank 130 is manufactured as a single body, space of the dishwasher 1 may be utilized to the maximum.

The second tank 140 is accommodated in the tank accommodation 135 of the first tank 130 in a tank-in-tank structure. On the contrary, the second tank 140 may accommodate the first tank 130 therein depending on design. As shown in FIG. 5, the second tank 140 includes a pair of panel-shaped internal walls 141 spaced from each other, and an internal side surface 143 connecting outer circumferences of the pair of panel-shaped internal walls 141. A contact area of the second tank 140 to the first tank 130 preferably accounts of 60 to 90 percent of the entire area. If the contact area is less than 60%, heat recovery efficiency declines. If the contact area is more than 90%, capacity for cold washing water is excessively reduced.

The second tank 140 is preferably formed by a plastic blow mold with a thickness of 0.5 to 2 t and is inserted in the first tank 130. The plastic blow molding has such strengths that a water leak may be prevented and is easy to manufacture. The second tank 140 may otherwise be made of metal. The second tank 140 may have various shapes depending on design, e.g. may be shaped like a curved pipe. The tank-in-tank structure of the heat recovery module 150 including the first and second tanks 130 and 140 is an example, and any structure is applicable as long as it enables cold washing water to recover heat from hot washing water.

The second tank 140 includes a hot washing water storage 145 storing therein hot washing water introduced from a lower part, a hot washing water discharger 146 discharging hot washing water which has transferred heat, an overflow partition 147 partitioning the hot washing water storage 145 and the hot washing water discharger 146, a plurality of downwardly-inclined inclination guides 148, and an insert molding pipe 149 forming an opening to deliver hot washing water which has passed the overflow partition 147 to an inside of the dishwashing tub 110.

The overflow partition 147 is formed on a lower part of the second tank 140 to partition the hot washing water storage 145 and the hot washing water discharger 146 and to allow them to communicate with each other from an upper part of the second tank 140. Then, hot washing water introduced to the hot washing water storage 145 through the circulation pipe 142 rises and moves to the hot washing water discharger 146 through an upper communication space.

The inclination guides 148 include "☐" direction guides and "☐" direction guide which are provided in left and right sides of the hot washing water storage 145 and are inclined downwards, a "/\" shape guide provided in the middle, and a "|" shape guides in three rows in the hot washing water discharger 146. The inclination guides 148 are 10 to 30 units and is provided in the second tank 140. If there are too many inclination guides 148, resistance rises and impurities are very likely to be accumulated. If there are too few inclination guides 148, a structural strength of the second tank 140 is reduced and a bulging phenomenon occurs. The inclination guides 148 extend to be inclined at an angle of approximately 20 to 70 degrees. The inclination guides 148 are e.g. 20 to 50 mm in length. As described above, the inclination guides 148 cause impurities to be easily discharged together with hot washing water to the sump 120 when the hot washing water, which has finished a heat recovery stroke, is discharged from the second tank 140. The inclination guides 148 prevent a bulging phenomenon and spread hot washing water evenly when the hot washing water is supplied to the hot washing water storage 145. If hot washing water is evenly spread within the second tank 140, heat exchange is carried out efficiently, thereby improving heat recovery performance and minimizing accumulation of impurities.

Figure 6:
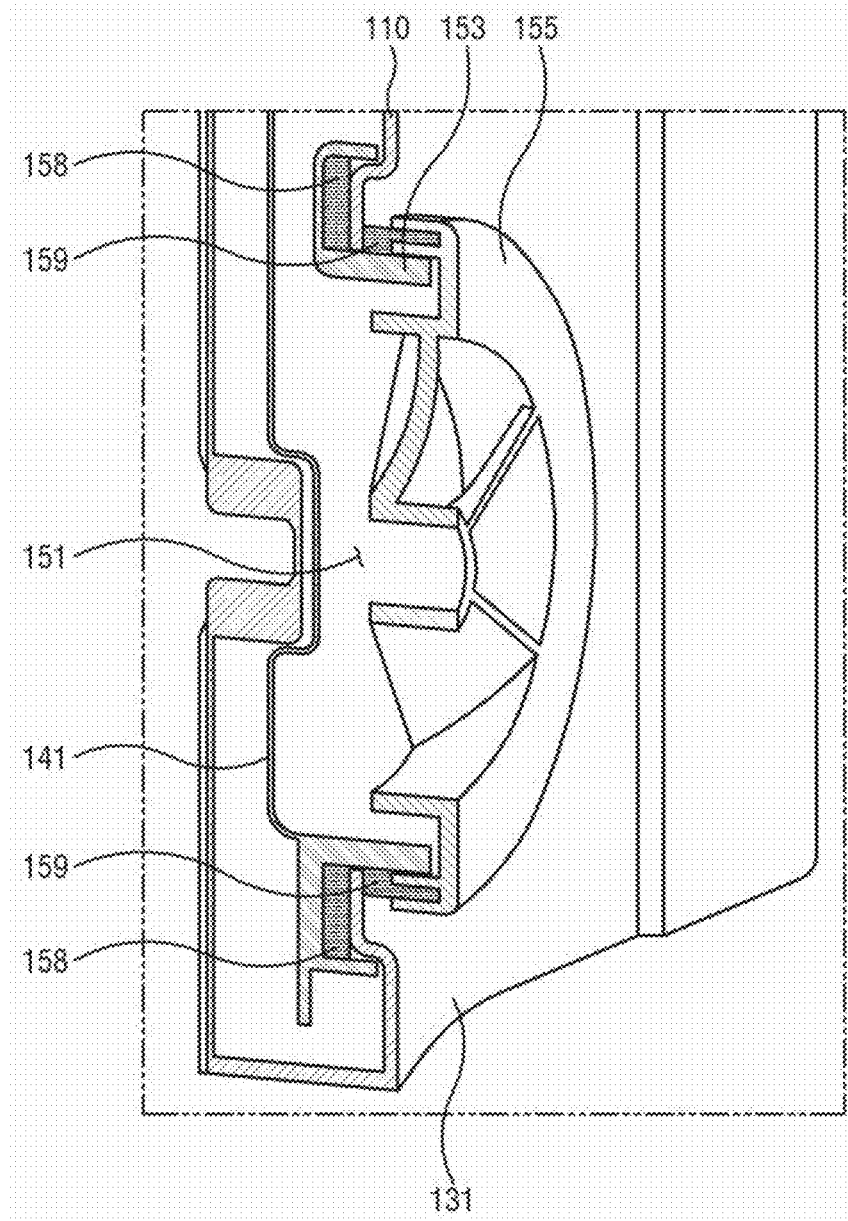
FIG. 6 is a cut-away perspective view of an insert molding pipe that is insert-molded in a second tank.
Figure 7:
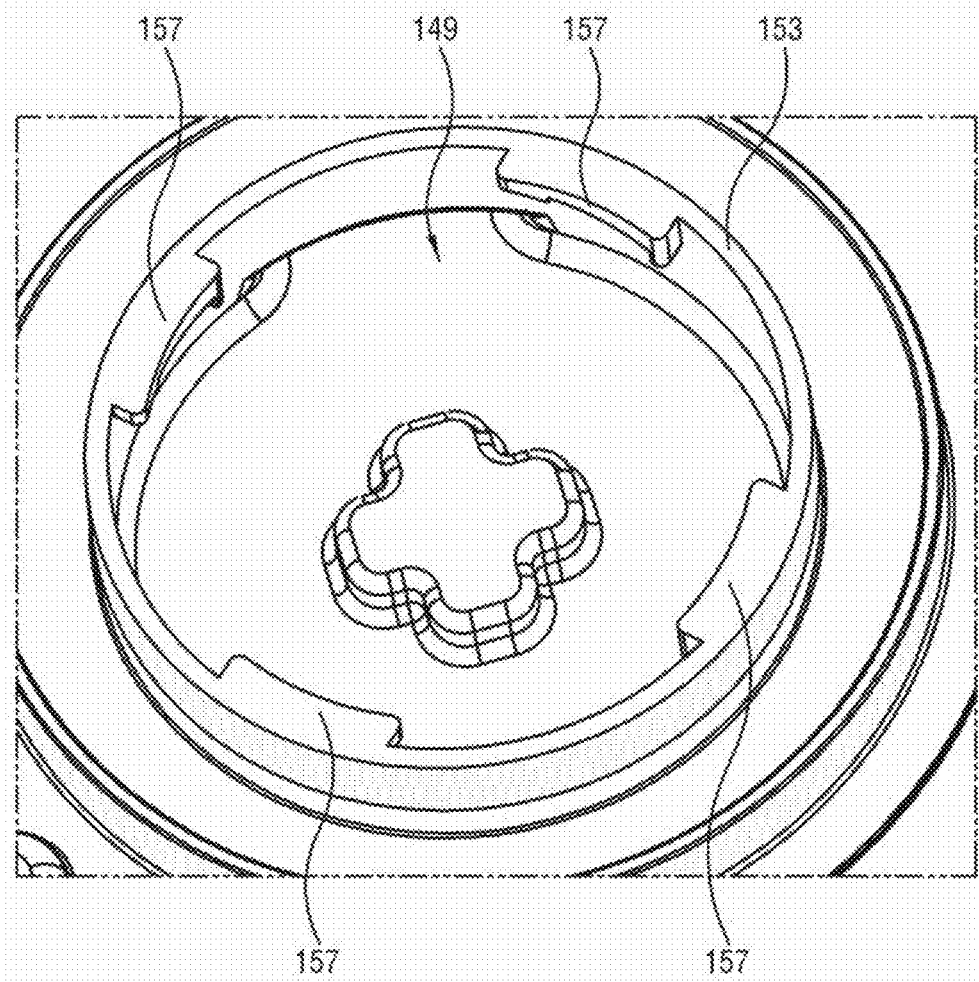
FIG. 7 is a perspective view of an insert molding pipe according to a first embodiment of the disclosure.
Figure 8:
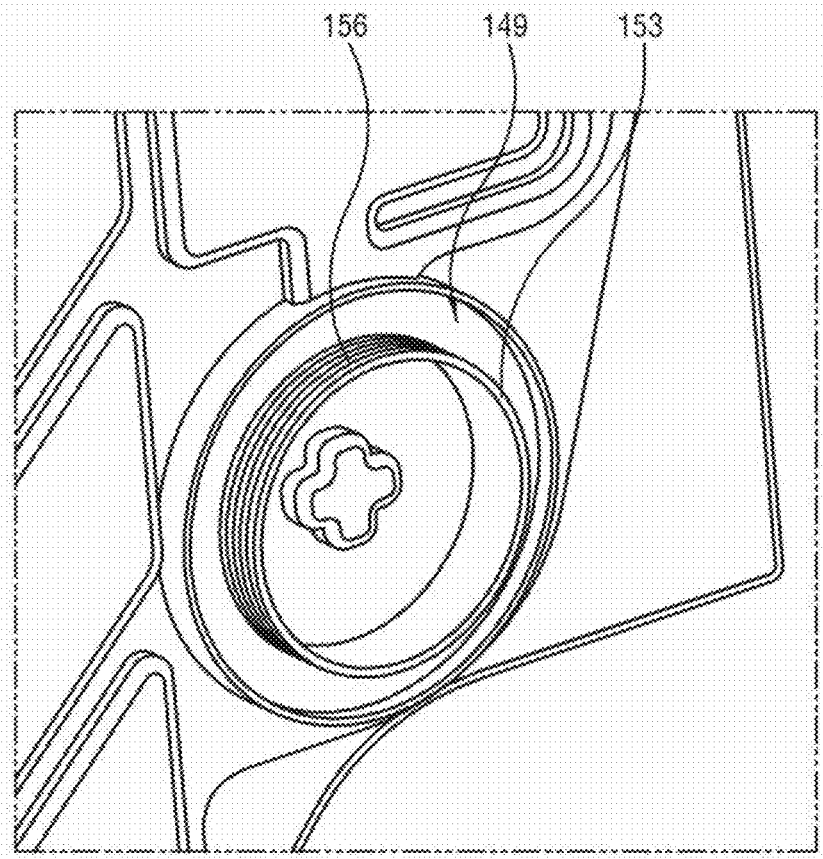
FIG. 8 is a perspective view of an insert molding pipe according to a second embodiment of the disclosure.

FIGS. 6 to 8 illustrate an insert molding pipe 149 that is insert-molded in the second tank 140.

The insert molding pipe 149 is insert-molded in the panel-shaped internal wall 141 of the second tank 140. The insert molding pipe 149 extends to penetrate the panel-shaped external walls 131 and a left wall 118 of the dishwashing tub 110 through an inside of the first tank 130. As shown in FIG. 6, the insert molding pipe 149 includes a hollow part 151 having a space inside, an end part 153 forming a washing water discharge opening, and a cap 155 coupled to the end part 153. The hollow part 151 is shaped like a pipe through which the washing water discharger 146 and the dishwashing tub 110 communicate with each other. The end part may include a screw 156 which is formed in an outer circumference to be coupled with the cap 155 through a screw as in FIG. 7, or may include a hook 157 which is formed in an inner circumference to be coupled with the cap 155 by a hook as in FIG. 8. As the end part 153 and the cap 155 of the insert molding pipe 149 are coupled to each other, the heat recovery model 150 may be firmly mounted in a lateral side of the dishwashing tub 110 without any water leak. The insert molding pipe 149 is sealed to the panel-shaped external walls 131 of the first tank 130 by a first sealing member 158. The insert molding pipe 149 is sealed to a lateral wall of the dishwashing tub 110 and to the cap 155 by a second sealing member 159.

Figure 9:
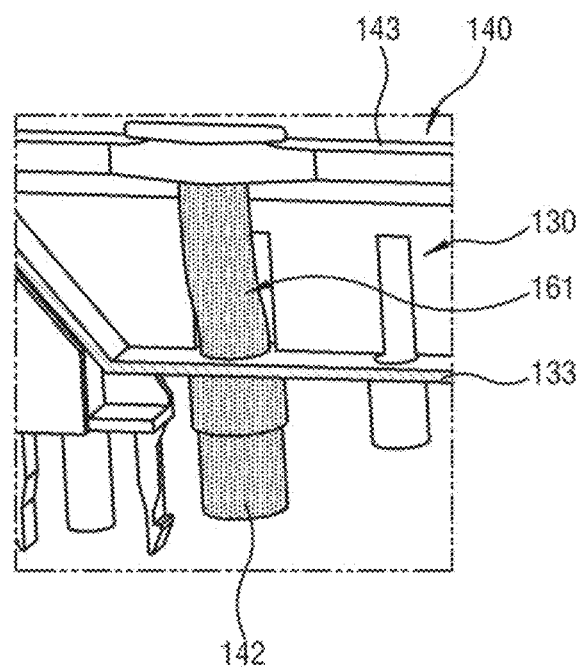
FIGS. 9 and 10 are a partial perspective view and a partial cut-away perspective view of a connection pipe structure connecting a circulation pipe and a second tank, respectively.
Figure 10:
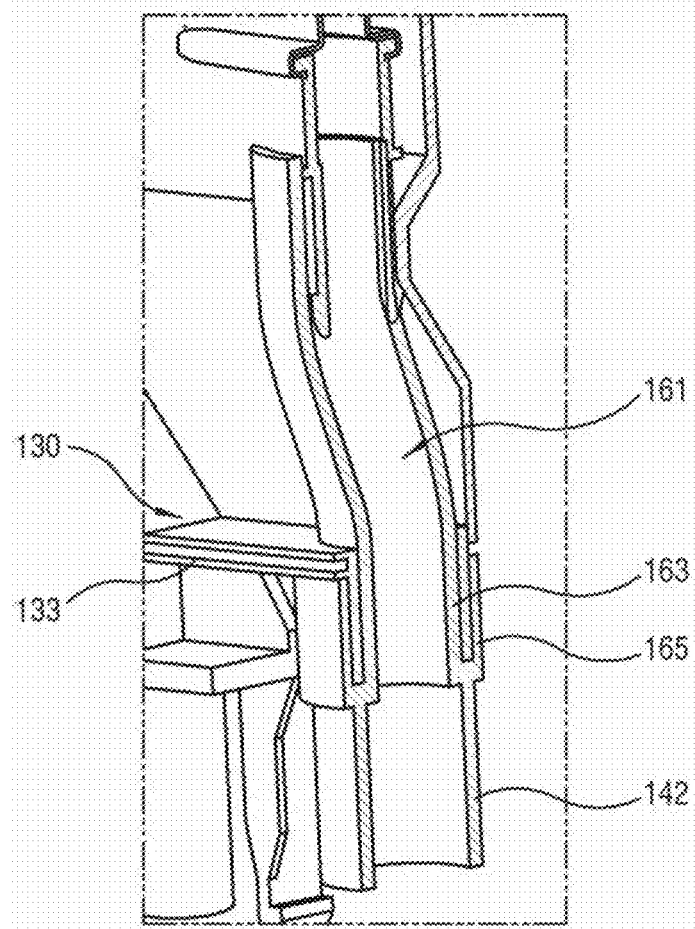

FIGS. 9 and 10 are a perspective view and a cut-away perspective view of a connection pipe 161 connecting the circulation pipe 142 and the second tank 140, respectively. As shown therein, a side of the connection pipe 161 is connected to an end part of the circulation pipe 142 and the other side of the connection pipe 161 is connected to the second tank 140. The connection pipe 161 communicates with an inside of the second tank 140 by penetrating the external side surface 133 of the first tank 130 and an internal side surface 143 of the second tank 140. As shown in FIG. 9, the connection pipe 161 includes dual hoses 163 and 165 to completely prevent water leak from the external side surface 133 of the first tank 130.

The water softener 160 softens cold washing water in a hard water state supplied by the external water supply pipe 137 and discharges softened cold washing water to the washing water supply pipe 132 through the water supply pipe 162. The cold washing water which is introduced to the washing water supply pipe 132 in a soft water state flows into and is stored in the first tank 130 if the water supply valve 134 is closed, and flows into both the sump 121 and the first tank 130 if the water supply valve 134 is open.

Figure 11:
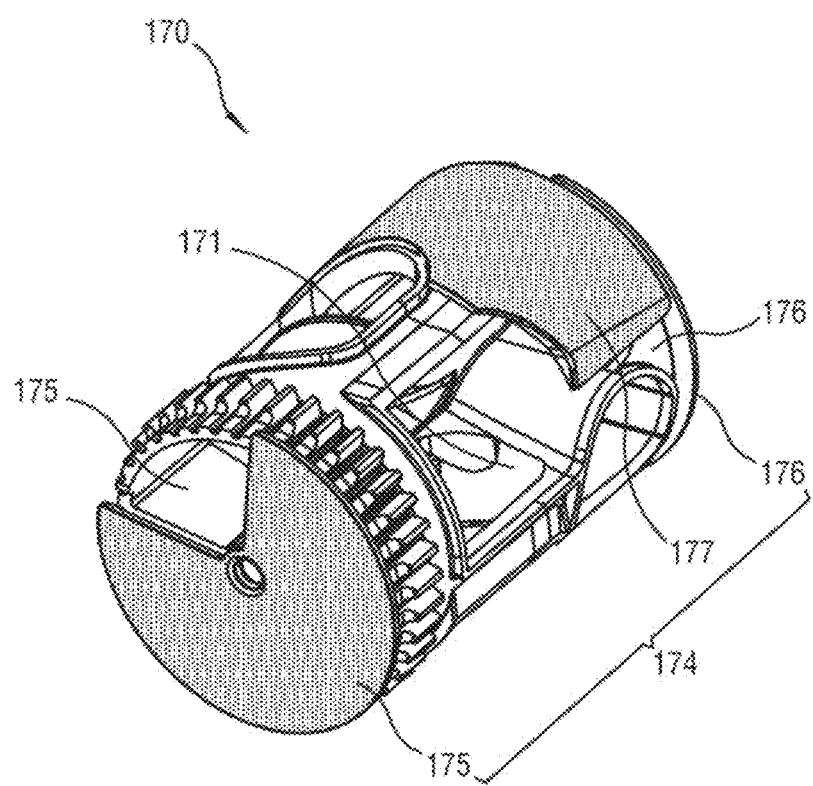
FIG. 11 is a perspective view of a cylinder-type distributor.
Figure 12:
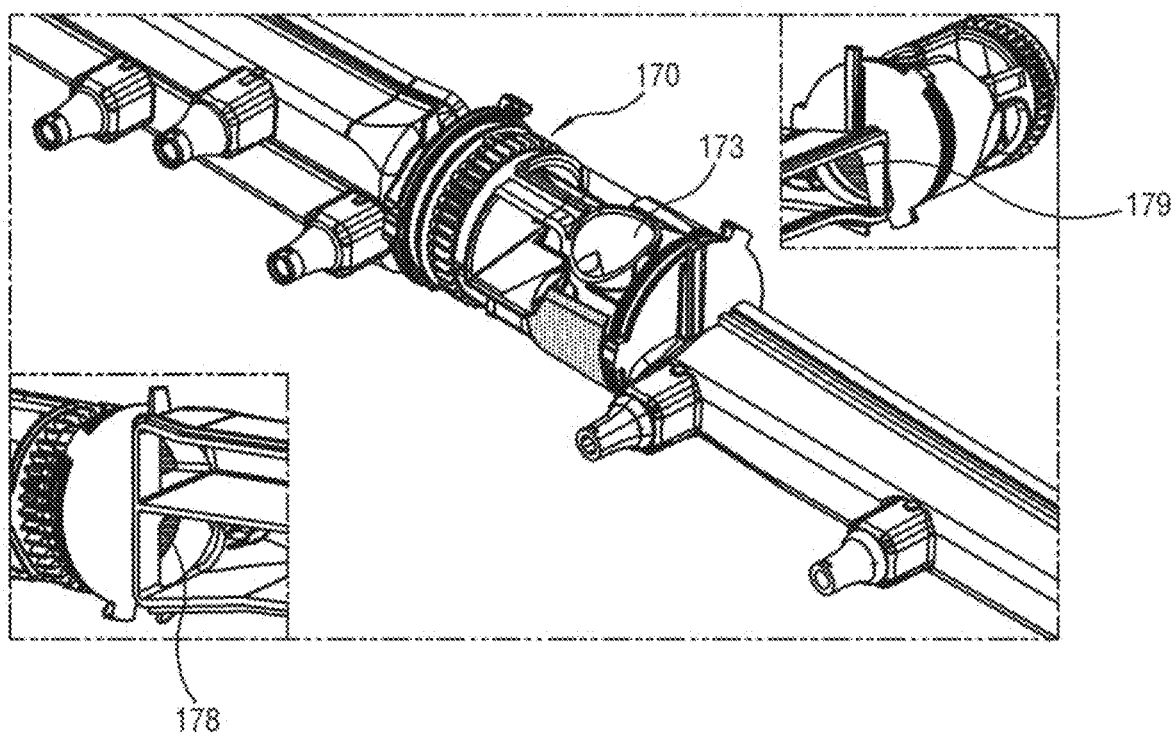
FIG. 12 illustrates a state of a distributor supplying washing water to upper and middle rotation nozzles.
Figure 13:
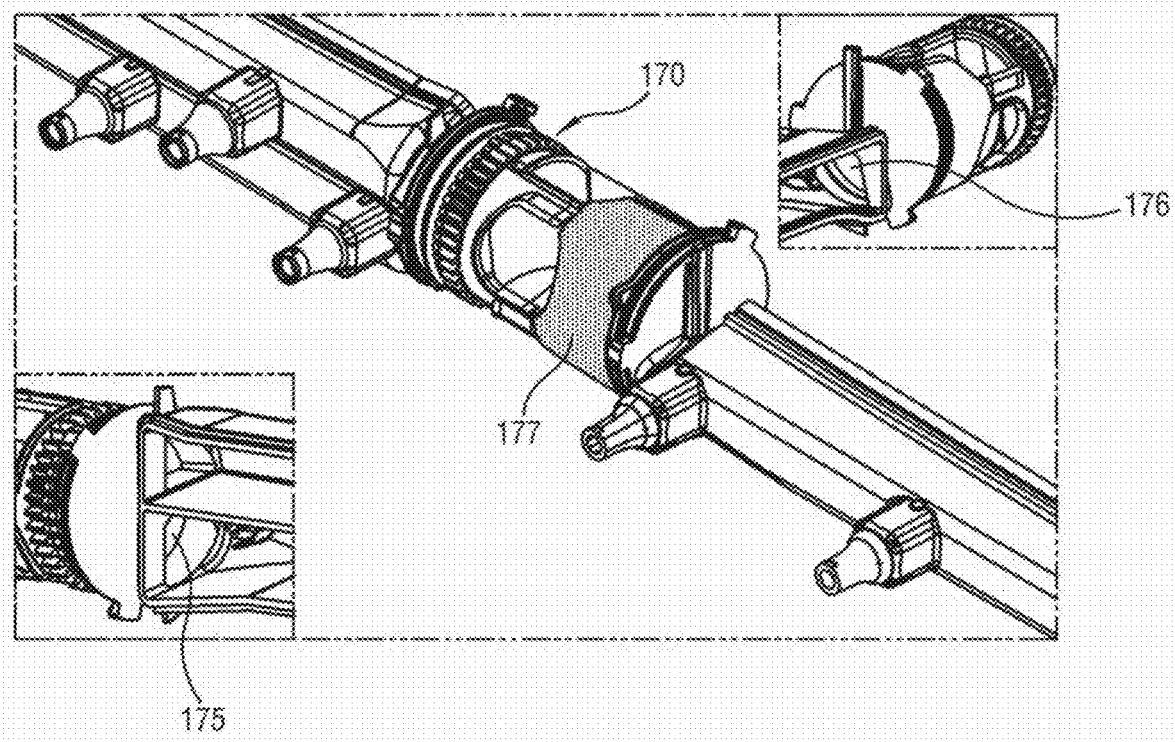
FIG. 13 illustrates a state of a distributor supplying washing water to a lower nozzle.

FIG. 11 is a perspective view of a cylinder-type distributor 170. FIG. 12 illustrates a state of the distributor 170 supplying washing water to the upper and middle rotation nozzles 113 and 114. FIG. 13 illustrates a state of the distributor 170 supplying washing water to the lower nozzle 115. FIG. 14 illustrates a state of the distributor 170 blocking washing water from being supplied to all nozzles 113, 114 and 115.

The distributor 170 distributes washing water in the sump 120, which has been supplied by the circulation pump 180, to the nozzles 113, 114 and 115. The distributor 170 may be implemented as a cylinder-type distributor as in FIG. 11. The distributor 170 is not limited to the cylinder-type distributor and may include various types of distributors. The distributor 170 includes a cylindrical drum 171 and a gap valve 174. The cylindrical drum 171 includes a central lower distribution hole (173 in FIG. 12) formed in an outer circumference of the drum 171, and left and right lower distribution holes 175 and 176 respectively formed in opposite ends of the drum 171. The gap valve 174 includes a first gap valve (177 in FIG. 11) opening and closing the central lower distribution hole 173, and second and third gap valves 178 and 179 opening and closing the left and right lower distribution holes 175 and 176, respectively, which are formed in opposite ends of the drum 171.

As shown in FIG. 12, if the gap valve 174 is at a zero degree rotation, the distributor 170 supplies washing water to the upper and middle rotation nozzles 113 and 114 as the first gap valve 177 opens the central lower distribution hole 173. At such time, the second and third gap valves 178 and 179 close the left and right lower distribution holes 175 and 176.

As shown in FIG. 13, if the gap valve 175 rotates 270 degrees, the first gap valve 177 closes the central lower distribution hole 173, and the second and third gap valves 178 and 179 open the left and right lower distribution holes 175 and 176.

In FIG. 14, if the gap valve 174 rotates 90 degrees, the first gap valve 177 closes the central lower distribution hole 173 and the second and third gap valves 178 and 179 close the left and right lower distribution holes 175 and 176. The gap valve 174 acts as a distribution blocking part not to distribute washing water to all nozzles 113, 114 and 115. This prevents washing water pumped from the sump 120 by the circulation pump 180 from being sprayed to the dishwashing tub 110 without heat recovery during a heat recovery circulation phase according to the disclosure.

It is also possible to add a distribution blocking valve (not shown) to the distribution pipe 172 instead of blocking the distribution by the distributor 170 itself during a heat recovery circulation phase as described above.

In a heat recovery circulation mode, the circulation pump 180 pumps washing water, which has been used for washing, from the sump 120 to the second tank 140. In a dishwashing mode, the circulation pump 180 pumps cold washing water for a next stroke from the sump 120 to the distributor 170 through the distribution pipe 172. At such time, as the circulation valve 144 of the circulation pipe 142 is closed, the cold washing water is prevented from being supplied to the second tank 140. As above, the sump 120 and the circulation pump 180 are commonly used in the heat recovery circulation mode and in the dishwashing mode. In the heat recovery circulation mode, the water supply valve 134 and the distributor 170 are closed and only the circulation valve 144 is open. In the dishwashing mode, the circulation valve 144 is closed, and the water supply valve 134 and the distributor 170 are open.

Between the heat recovery circulation mode and the dishwashing mode, the drainage pump 190 drains hot washing water and dirt from the sump 120 to the outside the main body 100. That is, before cold washing water for a next stroke is supplied from the first tank 130 to the sump 120, the drainage pump 190 drains hot washing water and dirt from the second tank 140 and the sump 120 to the outside.

The controller 200 executes a program command to control all components of the dishwasher 1. For example, the controller 200 may control and close the water supply valve 134 to store cold washing water for a next stroke in the first tank 130, may control and open the circulation valve 144 to supply hot washing water from the sump 120 to the second tank 140, may control the drainage pump 190 to drain cold washing water of the second tank 140, may control and close the circulation valve 144 after completion of the drainage, and may control and open the water supply valve 134 to use cold washing water for a next stroke.

The controller (200 in FIG. 15) may be implemented as an integrated circuit having a control function like e.g. system-on-chip (SoC) or as a control board including a general-use processor such as a central processing unit (CPU) and micro processing unit (MPU) and software.

The general-use processor may include a control program (or instruction) to perform a control operation, a non-volatile memory in which a control program is installed, a volatile memory to which at least part of the installed control program is loaded, and at least one processor or CPU executing the loaded control program.

The control program may include a program(s) that is implemented as at least one of BIOS, device driver, operating system, firmware, platform and application.

Hereinafter, a washing process of the dishwasher 1 will be described in detail with reference to FIGS. 15 to 17.

Figure 15:
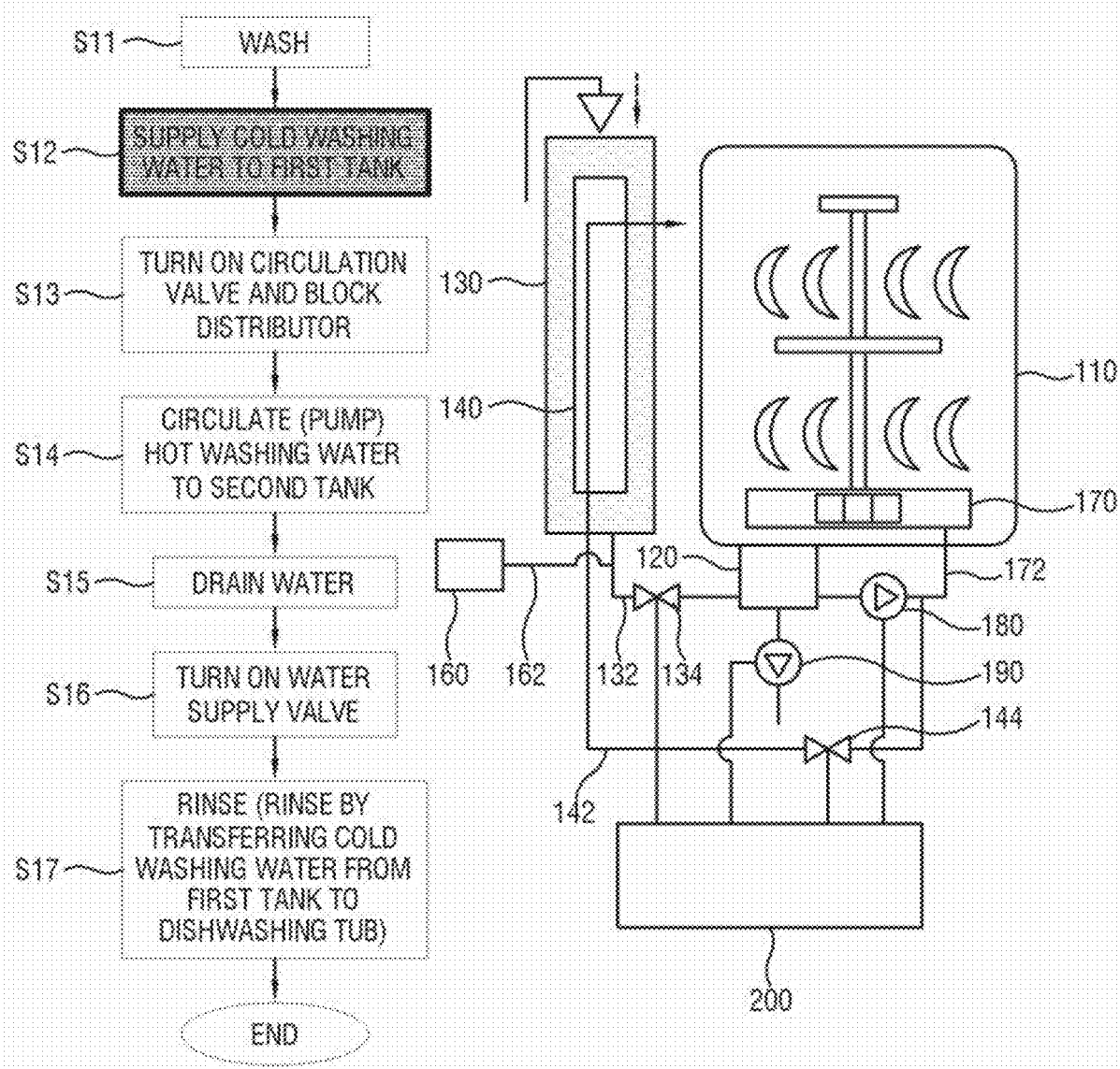
FIGS. 15 to 17 are brief block diagrams and flowcharts showing washing processes of a dishwasher.
Figure 16:
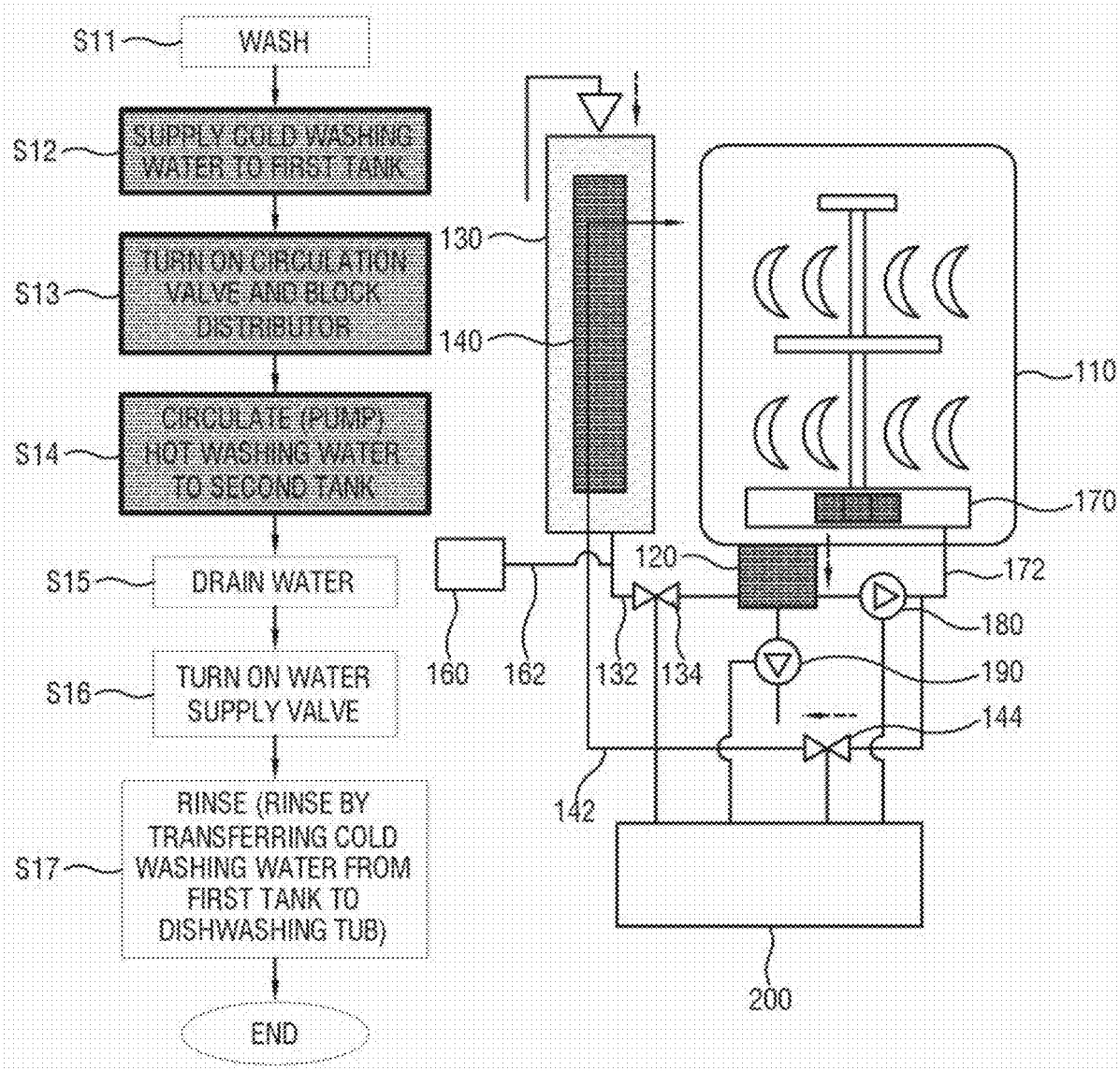
Figure 17:
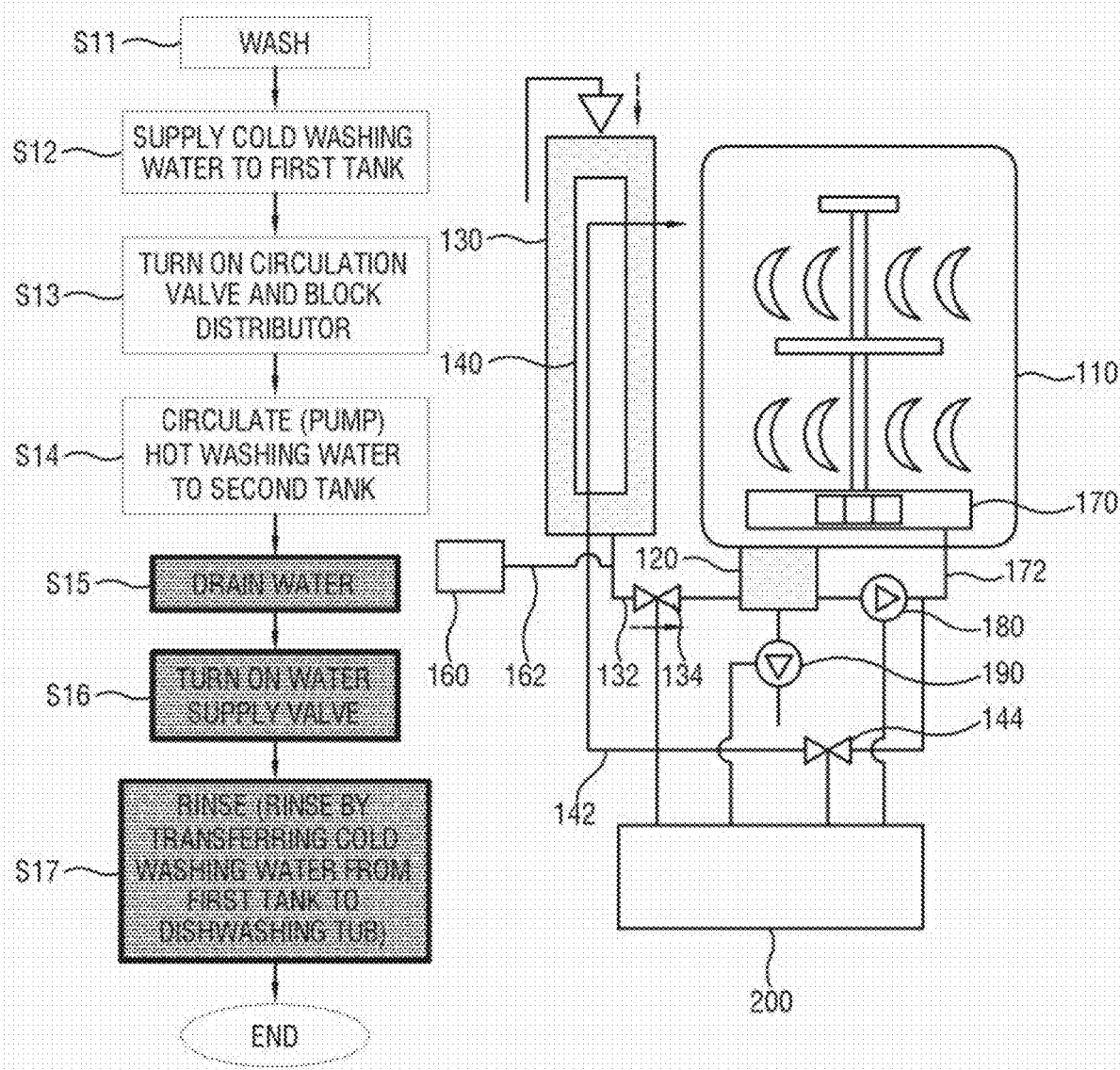

FIGS. 15 to 17 are brief block diagrams and flowcharts showing a washing process of the dishwasher 1.

At operation S11 in FIG. 15, dishes are washed in the dishwashing tub 110 by using washing water in the sump 120. At such time, washing water flows into the sump 120 provided in a lower part of the dishwasher 1 after being used in the dishwashing tub 110. Washing water gathered in the sump 120 is again used to wash dishes through the distributor 170. Washing water is repeatedly used to wash dishes by being circulated between the sump 120 and the dishwashing tub 110. At the time of washing, the controller 200 turns on the water supply valve 134, turns off the circulation valve 144, and turns on the distributor 170, or maintains the valves in the foregoing states.

At operation S12 in FIG. 15, the controller 200 supplies cold washing water for a next stroke, e.g. for a rinsing stroke to the first tank 130 while the operation S11 is being performed or after the operation S11 is performed. At such time, washing water in the first tank 130 is supplied through the water softener 160, and the water supply valve 134 is turned off or is kept in the off state.

At operation S13 in FIG. 16, following the supply of cold washing water at operation S12, the controller 200 rotates the gap valve 174 of the distributor 170 by 90 degrees and blocks distribution, and turns on the circulation valve 144 and turns off the water supply valve 134 or keeps the circulation valve 144 and the water supply valve 134 in the foregoing states.

At operation S14 in FIG. 16, following the completion of operation S13, the controller 200 operates the circulation pump 180 and pumps and circulates washing water from the sump 120 to the second tank 140. At such time, the controller 200 turns off the water supply valve 134 or keeps the water supply valve 134 in the off state.

At operation S15 in FIG. 17, following the completion of operation S14, the controller 200 operates the drainage pump 180 and drains all of hot washing water from the sump 120 and the second tank 140 to the outside. At such time, the controller 200 turns off the water supply valve 134 and turns on the circulation valve 144 or keeps the water supply valve 134 and the circulation valve 144 in the foregoing states.

At operation S16 in FIG. 17, following the completion of operation S15, the controller 200 opens the water supply valve 134 and supplies cold washing water, which has absorbed heat of the first tank 120, to the sump 120. At such time, the controller 200 turns off the circulation valve 144 or keeps the circulation valve 144 in the off state. If the quantity of washing water in the first tank 120 is insufficient, the controller 200 controls to additionally supply cold washing water from the water softener 160 to the sump 120.

At operation S17 in FIG. 17, following the completion of operation S16, the controller 200 operates the circulation pump 180 and supplies washing water from the sump 120 through the distribution pipe 172 to wash dishes in the dishwashing tub 110. At such time, the controller 200 turns off the circulation valve 144 or keeps the circulation valve 144 in the off state.

FIG. 18 shows a table setting forth each washing stroke, and the states of the water supply valve 134 and the circulation valve 144.

In an external water supply stroke, 2.5 L washing water is supplied to the external tank 130 after passing through the water softener 160 for e.g. 60 seconds. At such time, the water supply valve 134 is in the off state and the circulation valve 144 is in the on state.

In a circulation stroke, the circulation pump 180 is pumped to circulate washing water from the sump 120 to the second tank 140, the dishwashing tub 110 and the sump 120 at approximately 3000 rpm. At such time, the water supply valve 134 is in the off state and the circulation valve 144 is in the on state.

In a drainage stroke, the drainage pump 190 is operated and pumps washing water for e.g. 60 seconds from the sump 120 and the second tank 140 to the outside. The water supply valve 134 is in the off state and the circulation valve 144 is in the on state.

Returning to the external water supply stroke, washing water is supplied from the first tank 130 to the sump 120 for e.g. 60 seconds, and at the same time, external water is supplied to the first tank 130 through the water softener 160. At such time, the water supply valve 134 is in the on state and the circulation valve 144 is in the off state.

Although a few embodiments of the disclosure have been described in detail, various changes can be made in the disclosure without departing from the scope of claims.

The invention claimed is:

1. A dishwasher comprising:
   a dishwashing tub configured to wash dishes;
   a tank-in-tank structure including:
      a first tank configured to store therein cold washing water to be used for a next stroke; and
      a second tank configured to store therein hot washing water, which has been used in the dishwashing tub, the tank-in-tank structure configured to transfer heat from the stored hot washing water in the second tank to cold washing water in the first tank, wherein an area of the first tank is larger than an area of the second tank such that the second tank is accommodated in the first tank; and
   a circulation pipe configured to connect the dishwashing tub and the second tank to enable the hot washing water to circulate between the second tank and the dishwashing tub and comprising a circulation valve configured to allow the hot washing water to pass therethrough or to block the hot washing water from passing therethrough,
   wherein the dishwasher is configured to supply the washing water in the first tank, to which the heat from the second tank has been transferred, to the dishwashing tub.

2. The dishwasher according to claim 1, wherein the dishwashing tub comprises a sump which is arranged in a lower part of the dishwashing tub to gather hot washing water after use.

3. The dishwasher according to claim 2, further comprising a washing water supply pipe configured to connect the first tank and the sump.

4. The dishwasher according to claim 3, further comprising a water supply pipe configured to supply cold washing water from the outside and to be connected to the washing water supply pipe,
   wherein the water supply pipe is configured to supply cold washing water to the first tank through the washing water supply pipe.

5. The dishwasher according to claim 4, further comprising a water softener configured to change hard water into soft water,
   wherein the water supply pipe is configured to discharge cold washing water which has been softened by the water softener to the washing water supply pipe.

6. The dishwasher according to claim 4, wherein the washing water supply pipe comprises a water supply valve which is arranged after a connection point of the water supply pipe and supplies cold washing water or blocks supply of cold washing water.

7. The dishwasher according to claim 1, wherein the first tank and the second tank are mounted in a left side or a right side of the dishwasher.

8. The dishwasher according to claim 7, wherein the second tank is formed in the first tank by a blow molding.

9. The dishwasher according to claim 7, wherein the first tank comprises a pair of panel-shaped external walls facing each other leaving a space therebetween, and an external side surface connecting outer circumferences of the pair of panel-shaped external walls.

10. The dishwasher according to claim 7, wherein the second tank comprises a pair of panel-shaped internal walls respectively facing the pair of panel-shaped external walls leaving a space therebetween, and an internal side surface connecting outer circumferences of the pair of panel-shaped internal walls.

11. The dishwasher according to claim 1, wherein the second tank comprises an insert molding pipe which is integrally formed to extend from the first tank to the dishwashing tub.

12. The dishwasher according to claim 11, wherein the insert molding pipe comprises a cap which is coupled to an end part extending to the dishwashing tub.

13. The dishwasher according to claim 1, wherein the circulation valve comprises a connection pipe connected to the second tank through the first tank.

14. The dishwasher according to claim 1, further comprising a pump configured to forcibly circulate the hot washing water between the dishwashing tub and the second tank.

15. The dishwasher according to claim 14, further comprising a distributor configured to distribute cold washing water, which is supplied by the pump, to a plurality of nozzles in the dishwasher,
   wherein the distributor comprises a distribution blocking part configured to block a distribution of hot washing water during circulation of hot washing water.

\* \* \* \* \*